(12) United States Patent
Schmidt

(10) Patent No.: US 6,356,439 B1
(45) Date of Patent: Mar. 12, 2002

(54) GLARE REDUCING HOOD FOR A LAPTOP COMPUTER MONITOR

(75) Inventor: Robert P. Schmidt, Hermosa Beach, CA (US)

(73) Assignee: Hoodman Corporation, Redondo Beach, CA (US)

( * ) Notice: Subject to any disclaimer, the term of this patent is extended or adjusted under 35 U.S.C. 154(b) by 0 days.

(21) Appl. No.: 09/496,924

(22) Filed: Feb. 2, 2000

Related U.S. Application Data

(60) Provisional application No. 60/165,412, filed on Nov. 13, 1999, and provisional application No. 60/145,736, filed on Jul. 26, 1999.

(51) Int. Cl.[7] .............................. G06F 1/16; H04N 5/64
(52) U.S. Cl. ....................... 361/683; 361/679; 361/681; 135/117; 135/125; 135/128; D14/114; 353/75
(58) Field of Search .............................. 361/681, 682, 361/683, 679; 353/97; D14/114, 239; 348/818, 832, 834, 836, 842, 843, 373; 359/609, 601, 507, 503, 611–614, 738, 857, 863; 135/125, 97, 126, 128, 137, 143, 119, 116, 117, 120.3

(56) References Cited

U.S. PATENT DOCUMENTS

| | | | | | |
|---|---|---|---|---|---|
| 5,218,474 A | * | 6/1993 | Kirschner | .................... | 135/117 |
| 5,237,453 A | * | 8/1993 | Jones | .......................... | 359/601 |
| 5,325,970 A | * | 7/1994 | Dillon et al. | ................ | 361/681 |
| 5,337,772 A | * | 8/1994 | Habchi | ........................ | 135/137 |
| 5,400,903 A | * | 3/1995 | Cooley | ........................ | 361/681 |
| 5,638,852 A | * | 6/1997 | Dean | .......................... | 135/137 |
| D385,543 S | * | 10/1997 | Phirippidis et al. | ........ | D14/114 |
| 5,717,566 A | | 2/1998 | Tao | | |
| D397,686 S | * | 9/1998 | Bregman et al. | .......... | D14/114 |
| 5,905,546 A | | 5/1999 | Giulie et al. | | |
| 6,046,754 A | * | 4/2000 | Stanck | ........................ | 345/905 |
| 6,115,238 A | * | 9/2000 | von Gutfeld | ................ | 361/681 |

FOREIGN PATENT DOCUMENTS

WO      WO98/01800      1/1998

* cited by examiner

*Primary Examiner*—Gerald Tolin
*Assistant Examiner*—Lisa Lea-Edmonds
(74) *Attorney, Agent, or Firm*—Fildes & Outland, P.C.

(57) ABSTRACT

A glare reducing hood for a laptop computer monitor made of a fabric closure structure attached to and supported by an endless frame member. The closure structure has a mounting end that defines a mounting end opening and a viewing end that defines a viewing end opening. The hood is mounted on the laptop computer by placing the mounting end about edges of the monitor and the computer user views the monitor through the viewing end opening. The frame member is resiliently collapsible allowing the frame member to be folded into a flat shape for storage and allowing it to spring into a useable shape forming the glare reducing hood that conforms with a particular laptop computer monitor.

17 Claims, 5 Drawing Sheets

GLARE REDUCING HOOD FOR A LAPTOP COMPUTER MONITOR

CROSS REFERENCE TO RELATED APPLICATIONS

This application claims the benefit of U.S. Provisional Application Ser. No. 60/145,736, filed Jul. 26, 1999 and Provisional Application Ser. No. 60/165,412, filed Nov. 13, 1999.

TECHNICAL FIELD

This invention relates to a glare reducing hood mountable on the monitor of a laptop computer to reduce and/or eliminate glare seen on the monitor by a laptop computer user.

BACKGROUND OF THE INVENTION

It is known in the art relating to computers to provide a glare reduction device to reduce and/or prevent glare created by ambient light on a computer monitor of a desktop computer. Ambient light, especially in an outdoor environment, makes it difficult to see the computer monitor properly. It is necessary to preclude as much of this light as possible from reaching the monitor so that viewing of the computer monitor is improved.

Glare reducing hoods for desktop computers are not useable with a laptop or portable computer. Such hoods obstruct the keyboard of a laptop computer, preventing the user from using it. Further, although some of the existing hoods are portable and collapsible, they are not sufficiently compact for storage in a portable computer carrying case. Furthermore, such hoods are not durably made to allow the hood to be folded and unfolded many times in a single day. Thus, there is a need for a hood that is lightweight, portable and easily attachable to a laptop computer monitor and durably made to allow numerous daily uses.

SUMMARY OF THE INVENTION

The present invention provides a collapsible glare reducing hood that is openable to a shape conforming to a laptop computer monitor. The hood is made of a closure structure attached to an endless frame member. The hood can be folded flat for storage and placed in a storage case. When released from the case the endless frame member springs back to a hood shape constrained by the closure structure.

The closure structure includes a mounting end that defines a mounting end opening. The closure structure is mounted to the computer monitor by placing the mounting end opening about the edges of the monitor. The spring tension of the endless frame member retains the hood about the monitor. To securely mount the hood about the monitor, a securing means may be included on the hood. The securing means may be a flap attached to an edge of the mounting end such that the flap extends over a top edge of the monitor and toward the back of the monitor, securing the hood in place.

Further, the flap and the storage case may include cooperating hook and loop strips, such as are known and sold under the trademark "VELCRO" to allow the storage case to be attached to the hood while the hood is mounted on the monitor. The attachment of the case to the hood counterbalances the weight of the hood, preventing the hood from tipping toward the keyboard of the laptop. One strip is attached to the flap of the hood and the other is attached to the storage case.

The closure structure also includes a viewing end opposite the mounting end that defines a viewing end opening. The computer user views the computer monitor through the viewing end opening. The closure structure tapers from the mounting end to the viewing end, wherein the mounting end opening is larger than the viewing end opening. The endless frame member supports the closure structure and provides stiffness to the hood.

In one embodiment of the invention, the closure structure includes upper, lower and side panels or surfaces. The upper and lower surfaces generally have a parabolic shape. The side surfaces have corresponding shapes that are sectors of a generally elliptical shape. Such a configuration allows the computer user to use the keyboard of the laptop computer while the hood is mounted on the monitor. The closure structure may be made from a nylon or polyester material to allow it to be durable and light weight.

The endless frame member is a continuous member that provides support for the closure structure and stiffness to the hood. It is disposed within an endless enclosure that is formed by folding an edge of the closure structure over the endless frame member and hemming the edge to retain the frame therein. The endless frame member may be what is referred to as memory wire by those skilled in the art. The memory wire allows the hood to be collapsed into a flat shape and placed in a storage case. When the hood is taken out of the case, the memory wire springs back or returns to its original useable shape. The wire may be made from a metal or non-metallic material.

These and other features and advantages of the invention will be more fully understood from the following detailed description of the invention taken together with the accompanying drawings.

DETAILED DESCRIPTION OF THE INVENTION

Figure 1:
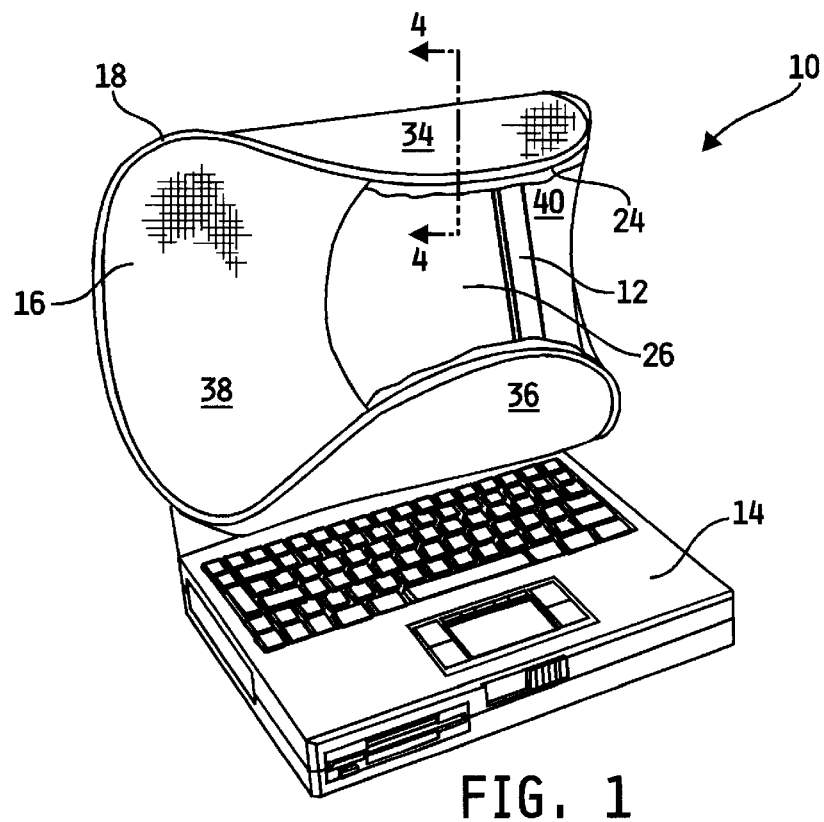
FIG. 1 is a perspective view of the front of a glare reducing hood mounted about a laptop computer monitor in accordance with the present invention.
Figure 2:
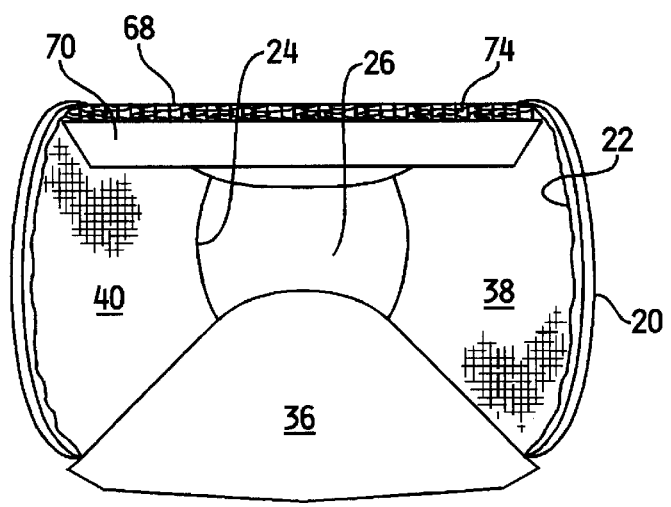
FIG. 2 is a perspective view of a mounting end of the glare reducing hood.
Figure 3:
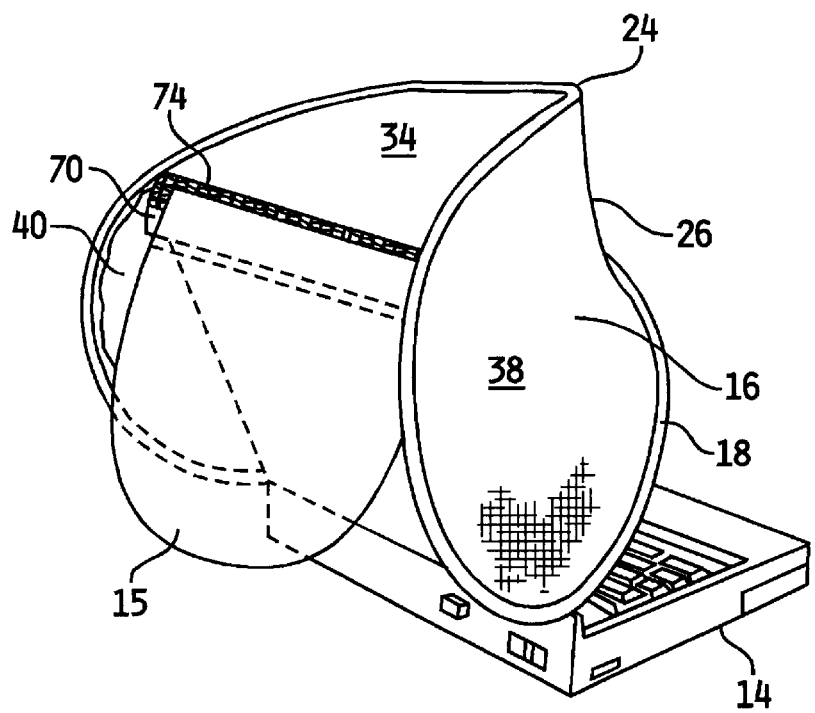
FIG. 3 is a perspective view of the back of the computer with the glare reducing hood mounted about the computer monitor and a storage case attached to the hood.
Figure 8:
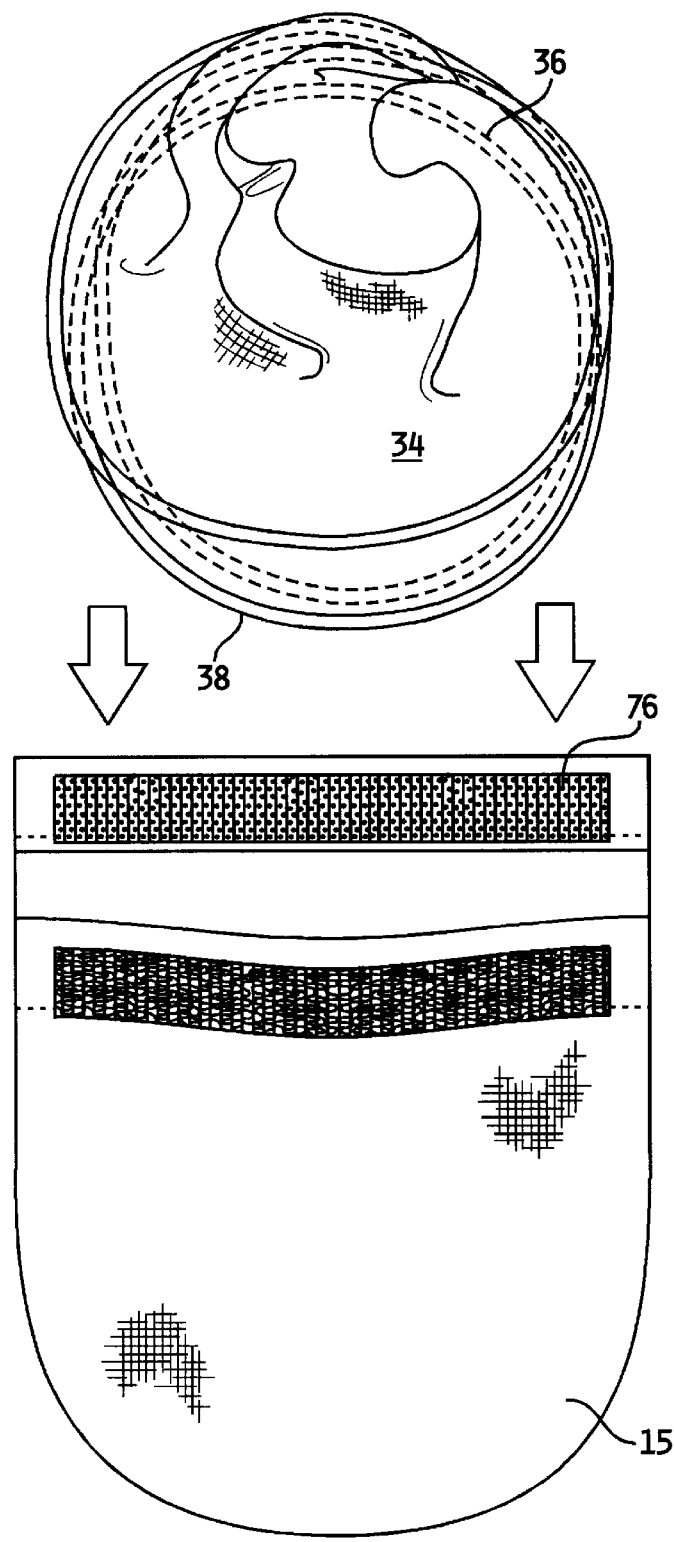
FIG. 8 is a top view of the glare reducing hood in a fully collapsed position being placed within the storage case.

Referring now to FIGS. 1–3 of the drawings in detail, numeral 10 generally indicates a glare reducing hood mounted about a monitor 12 of a laptop computer 14. The hood 10 reduces the glare on the monitor by surrounding all sides of the monitor 12 and providing a shaded viewing area. When the hood 10 is not in use, it can be easily folded into a flat compact configuration which fits within a small storage case 15 as shown in FIG. 8. To use the hood 10, it is taken out of the case 15 and it springs back to its original hood shape or useable shape for attachment to the monitor 12.

The hood 10 generally includes a closure structure 16 supported on an endless frame member 18. The closure structure 16 includes a mounting end 20 which defines a mounting end opening 22. The hood 10 is mounted on the monitor 12 by placing the mounting end 20 over the edges of the monitor 12 whereby the hood 10 projects outwardly from the front of the monitor 12 as shown in FIGS. 1 and 3. Further, FIG. 3 illustrates from the back of the laptop computer 14 the hood 10 being mounted on the monitor 12. Spring tension of the endless frame member 18 retains the hood 10 about the monitor 12.

The closure structure 16 also includes a viewing end 24 opposite the mounting end 20 which defines a viewing end opening 26. The closure structure 16 tapers from the mounting end 20 to the viewing end 24 wherein the mounting end opening 22 is larger than the viewing end opening 26. The computer user views the monitor 12 through the viewing end opening 26.

Figure 4:
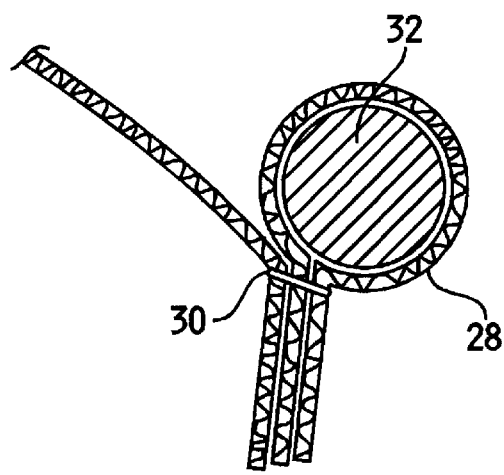
FIG. 4 is a cross-sectional view of the glare reducing hood taken along line 4—4 in FIG. 1.

The endless frame member 18 provides support for the closure structure 16. The endless frame member 18 is made from a flexible material to allow the hood 10 to be folded into a collapsed shape as shown in FIG. 8 and is openable to a useable shape as shown in FIGS. 1–3. The endless frame member 18 may be disposed within an endless enclosure 28 as shown in FIG. 4. The enclosure 28 is formed by folding an edge 30 of the closure structure 16 over the endless frame member 18 and hemming the edge 30 to retain the frame member 18 therein.

Member 18 may be what is referred to as memory wire 32 by those skilled in the art as shown in FIG. 4. The memory wire 32 allows the hood 10 to be folded into a flat shape and when the hood 10 is unfolded the wire 32 springs back to its original shape. The wire 32 may be made from a metal or non-metallic material. A suitable metal is spring steel.

In one embodiment of the present invention the closure structure 16 includes upper, lower and side panels or surfaces 34, 36, 38, 40, respectively. The upper and lower surfaces 34, 36 generally have a parabolic shape. The side surfaces 38, 40 have corresponding shapes that are sectors of a generally elliptical shape. Such a configuration allows the computer user to use the keyboard of the laptop computer 14 while the hood 10 is mounted on the monitor 12. The closure structure 16 may be made from a flexible material. The flexible material may be a fabric material such as nylon or polyester to allow the closure structure 16 to be durable and light weight.

Figure 5:
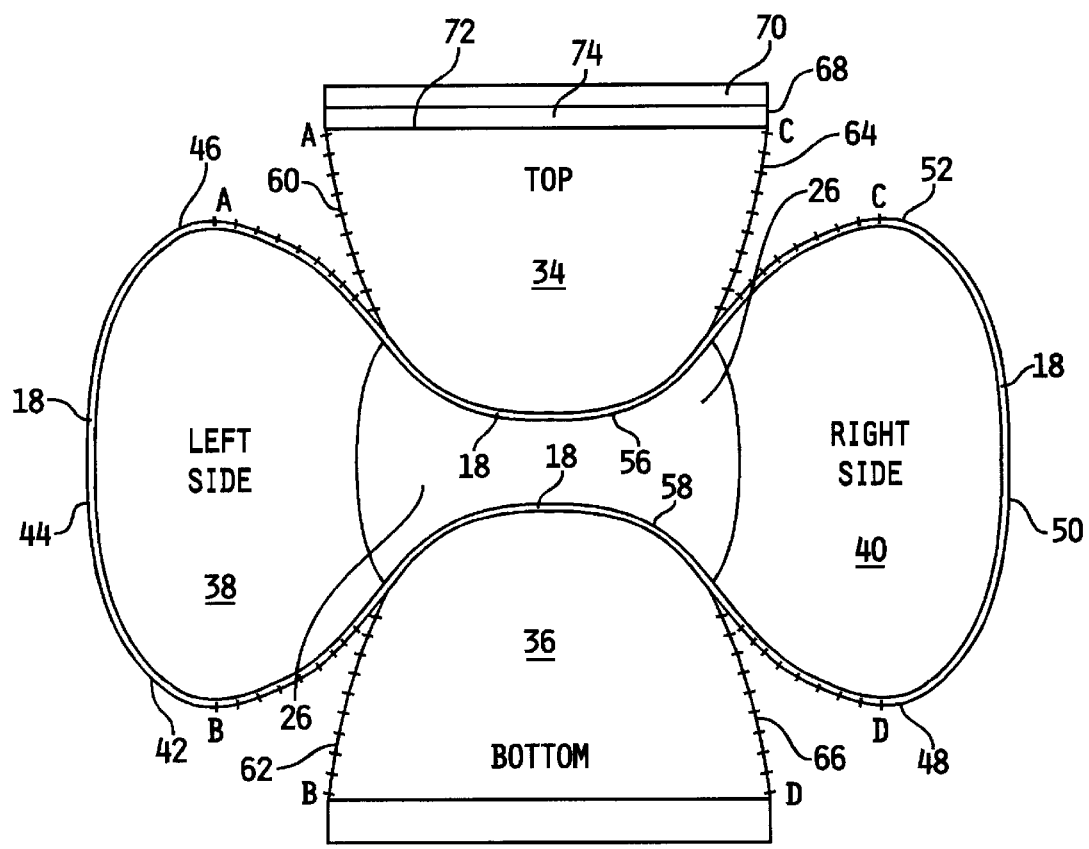
FIG. 5 is a plan view of the inside layout of the glare reducing hood.

FIG. 5 illustrates a plan view of the hood 10. The wire 32 continuously extends around three edges 42, 44, 46 of side 38 and further extends around three edges 48, 50, 52 of side 40. In between the sides 38, 40, the wire 32 only extends around edge 56 of the upper surface 34 and only around edge 58 of the lower surface 36. The hood 10 is assembled by sewing edge 46 of side 38 to edge 60 of the upper surface 34 to form seam line A. Edge 42 of side 38 is sewn to edge 62 of the lower surface 36 to form seam line B. Further, edge 52 of side 40 is sewn to edge 64 of the upper surface 34 to form seam line C. Lastly, edge 48 of side 40 is sewn to edge 66 of the lower surface 36 to form seam line D and complete the hood assembly.

Figure 6:
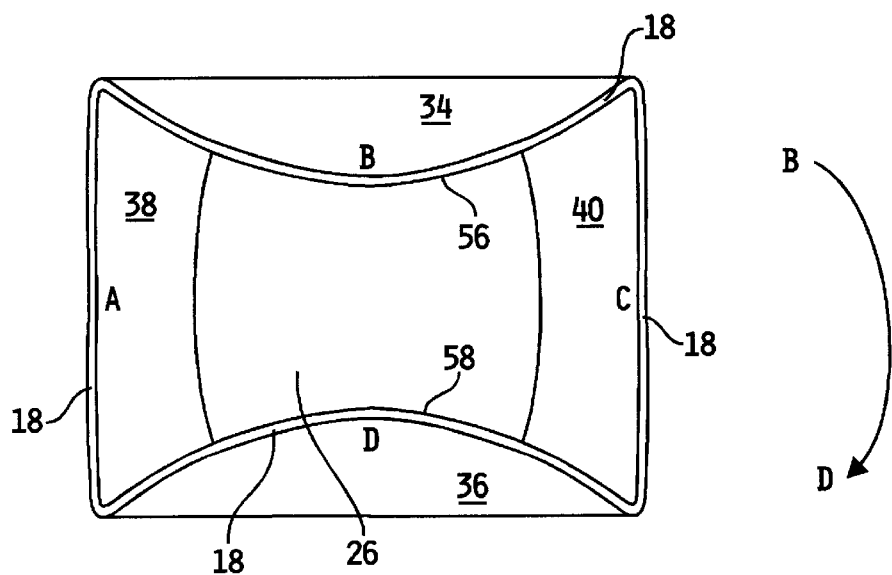
FIG. 6 is a front view of the glare reducing hood.
Figure 7:
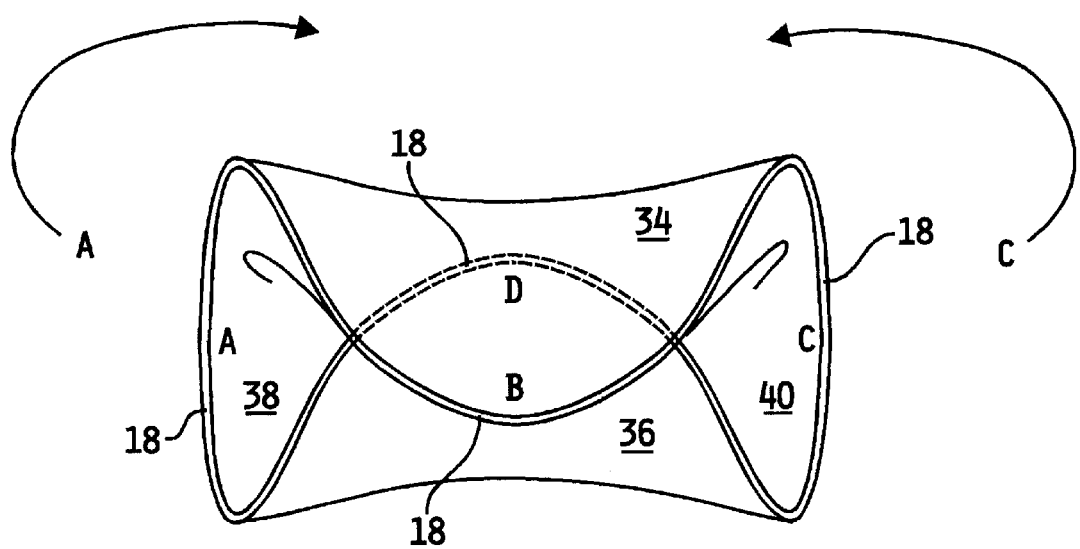
FIG. 7 is a front view of the glare reducing hood with the upper and lower surfaces overlapping each other in a partially collapsed position.

In FIG. 6, the hood 10 is opened to a useable shape. To collapse the hood 10, seam line B is folded or bent toward seam line D until the upper surface 34 overlaps the lower surface 36 as shown in FIG. 7. Then seam line C is folded back behind the upper and lower surfaces. Finally, seam line A is folded back behind side 40 to completely collapse the hood 10. FIG. 8 illustrates the hood 10 in a fully collapsed shape. Once the hood 10 is collapsed, it may be conveniently stored in the storage bag 15 until the next use.

The glare reducing hood 10 may be secured to the monitor 12 by securing means 68 that are included on the hood 10. The securing means may be a flap 70 attached to an edge 72 of the upper surface 34. The flap 70 extends over the top of the monitor 12 toward the back of the monitor 12.

Further, the flap 70 and storage case 15 may include cooperating hook and loop strips, such as are known and sold under the trademark "VELCRO" to allow the storage case 15 to be attached to the hood 10 while the hood 10 is mounted about the monitor 12. The attachment of the case 15 to the hood 10 counterbalances the weight of the hood 10, preventing the hood 10 from tipping toward the keyboard of the laptop computer 14. Each strip includes a hook strip portion 74 which is attachable to the flap 70 of the hood 10 and a loop strip portion 76 that is attached to the storage case 15. Alternatively, the loop strip portion 76 may be attached to the flap 70 and the hook strip portion 74 may be attached to the storage case 15.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A glare reducing hood for a laptop computer monitor, the hood comprising:
   an endless frame member; and
   a closure structure having a mounting end including a mounting end opening and also a viewing end including a viewing end opening,
   said closure structure being supported on said endless frame member and said frame member being resiliently collapsible whereby said closure structure can be folded into a flat shape for storage and allowed to spring into a useable shape forming the glare reducing hood.

2. A glare reducing hood as in claim 1 wherein the endless frame member is disposed within an endless enclosure formed by folding an edge of the closure structure over said endless frame member and hemming the edge to retain said endless frame member therein.

3. A glare reducing hood as in claim 1 wherein said closure structure includes an upper surface, a lower surface and side walls having corresponding shapes.

4. A glare reducing hood as in claim 3 wherein said upper and lower surfaces are generally parabolically shaped.

5. A glare reducing hood as in claim 4 wherein said side walls are each sectors of a generally elliptical shape.

6. A glare reducing hood as in claim 1 wherein said mounting end opening is larger than said viewing end opening wherein said hood tapers from the mounting end to the viewing end.

7. A glare reducing hood as in claim 1 wherein said endless frame member is memory wire.

8. A glare reducing hood as in claim 7 wherein said memory wire is spring steel.

9. A glare reducing hood as in claim 1 wherein said closure structure is made from a fabric material.

10. A glare reducing hood as in claim 9 wherein the fabric material is nylon.

11. A glare reducing hood as in claim 9 wherein the fabric material is polyester.

12. A glare reducing hood as in claim 1 further including securing means for securing the hood to the monitor.

13. A glare reducing hood as in claim 12 wherein the securing means is a flap attached to an edge of the mounting end such that the flap extends over a top edge of the monitor and to a back surface of the monitor.

14. A glare reducing hood as in claim 1 further including a storage case for storing the hood and maintaining the hood in the folded flat shape.

15. A glare reducing hood as in claim 14 wherein the storage case includes a connector for connecting the case to the hood to counterbalance the weight of the hood.

16. A glare reducing hood as in claim 15 wherein the connector includes cooperating hook and loop strips wherein one of the strips is attached to the hood and the other is attached to the storage case.

17. A glare reducing device for a laptop computer monitor, the device comprising:

a hood including:
    an endless frame member, and
    a closure structure having a mounting end including a mounting end opening and also a viewing end including a viewing end opening,
  said closure structure being supported on said endless frame member and said frame member being resiliently collapsible whereby said closure structure can be folded into a flat shape for storage and allowed to spring into a useable shape forming the glare reducing hood; and
  a storage case for storing the hood and maintaining the hood in the folded flat shape.

* * * * *